United States Patent
Gernoth et al.

(10) Patent No.: US 10,762,335 B2
(45) Date of Patent: Sep. 1, 2020

(54) ATTENTION DETECTION

(71) Applicant: Apple Inc., Cupertino, CA (US)

(72) Inventors: Thorsten Gernoth, Cupertino, CA (US); Joerg A. Liebelt, San Jose, CA (US); Onur C. Hamsici, Cupertino, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 15/934,578

(22) Filed: Mar. 23, 2018

(65) Prior Publication Data
US 2018/0336399 A1    Nov. 22, 2018

Related U.S. Application Data

(60) Provisional application No. 62/507,084, filed on May 16, 2017, provisional application No. 62/556,401, (Continued)

(51) Int. Cl.
| | |
|---|---|
| *G06K 9/00* | (2006.01) |
| *G06F 3/01* | (2006.01) |
| *G06N 20/00* | (2019.01) |
| *G06F 15/76* | (2006.01) |
| *G06F 1/3234* | (2019.01) |
| *G06K 9/62* | (2006.01) |
| *G06F 1/3231* | (2019.01) |

(Continued)

(52) U.S. Cl.
CPC ....... *G06K 9/00288* (2013.01); *G06F 1/3231* (2013.01); *G06F 1/3265* (2013.01); *G06F 3/012* (2013.01); *G06F 15/76* (2013.01); *G06K 9/00255* (2013.01); *G06K 9/00268* (2013.01); *G06K 9/6274* (2013.01); *G06K 9/6277* (2013.01); *G06N 3/0445* (2013.01); *G06N 3/08* (2013.01); *G06N 20/00* (2019.01); *G06N 20/10* (2019.01)

(58) Field of Classification Search
None
See application file for complete search history.

(56) References Cited

U.S. PATENT DOCUMENTS

| | | |
|---|---|---|
| 8,150,142 B2 | 4/2012 | Freedman et al. |
| 8,384,997 B2 | 2/2013 | Shpunt et al. |

(Continued)

OTHER PUBLICATIONS

U.S. Appl. No. 15/787,307, filed Oct. 18, 2017, Biron et al.

(Continued)

*Primary Examiner* — Wei Wen Yang
(74) *Attorney, Agent, or Firm* — Kowert, Hood, Munyon, Rankin & Goetzel, P.C.; Gareth M. Sampson (57) ABSTRACT

Detection of a user paying attention to a device may be used to enable or support biometric security (e.g., facial recognition) enabled features on the device. Images captured by a camera on the device may be used to determine if the user is paying attention to the device. Facial features of the user's face in the images may be assessed to determine if the user is paying attention to the device. Facial features may be assessed through comparison of feature vectors generated from the captured image feature to a set of known feature vectors. The known feature vectors for attention may be generated using a machine learning process.

16 Claims, 6 Drawing Sheets

Related U.S. Application Data filed on Sep. 9, 2017, provisional application No. 62/556,826, filed on Sep. 11, 2017.

(51) Int. Cl.
  *G06N 3/04* (2006.01)
  *G06N 3/08* (2006.01)
  *G06N 20/10* (2019.01)

(56) References Cited

U.S. PATENT DOCUMENTS

| | | |
|---|---|---|
| 8,639,291 B1 | 1/2014 | Gailloux |
| 8,749,796 B2 | 6/2014 | Pesach et al. |
| 8,913,839 B2 | 12/2014 | Ricanek, Jr. et al. |
| 9,370,302 B2 | 6/2016 | Krueger |
| 9,576,126 B2 | 2/2017 | Boshra et al. |
| 9,600,711 B2 | 3/2017 | Shreve et al. |
| 9,666,088 B2 | 5/2017 | Dalal et al. |
| 9,721,150 B2 | 8/2017 | Gottemukkula et al. |
| 9,836,643 B2 | 12/2017 | Saripalle et al. |
| 2002/0105575 A1 | 8/2002 | Hinde |
| 2007/0061851 A1 | 3/2007 | Deshpande et al. |
| 2010/0035589 A1 | 2/2010 | Wormald et al. |
| 2013/0059561 A1 | 3/2013 | Leemet et al. |
| 2013/0247175 A1 | 9/2013 | Nechyba et al. |
| 2014/0080428 A1* | 3/2014 | Rhoads ............... H04W 4/70 455/88 |
| 2015/0227740 A1 | 8/2015 | Boshra et al. |
| 2015/0347810 A1 | 12/2015 | Boshra et al. |
| 2016/0178915 A1 | 6/2016 | Mor et al. |
| 2017/0344807 A1 | 11/2017 | Jillela et al. |
| 2018/0034852 A1* | 2/2018 | Goldenberg ............ G06F 21/32 |
| 2018/0144184 A1* | 5/2018 | Frischholz ......... G06K 9/00228 |

OTHER PUBLICATIONS

Hu, Chunlong, et al., "An effective head pose estimation approach using Lie Algebrized Gaussians based face representation," Dec. 1, 2014, Multimedia tools and applications 73.3 (2014): 1863-1884, 23 pages.

\* cited by examiner

FIG. 10

ATTENTION DETECTION

PRIORITY CLAIM

This patent claims priority to U.S. Provisional Patent Application No. 62/507,084 to Gernoth et al., entitled "Attention Detection", filed May 16, 2017; to U.S. Provisional Patent Application No. 62/556,401 to Gernoth et al., entitled "Attention Detection", filed Sep. 9, 2017; and to U.S. Provisional Patent Application No. 62/556,826 to Gernoth et al., entitled "Attention Detection", filed Sep. 11, 2017, each of which are incorporated by reference in their entirety.

BACKGROUND

1. Technical Field

Embodiments described herein relate to methods and systems for detecting user attention related to a device. More particularly, embodiments described herein relate to the use of camera sensors in detecting user attention to a display of the device.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

Attention of a user to the device may play a role in a facial recognition process. For example, the user may not want the device to unlock or perform other operations unless the user is paying attention to the device. Additional security functions and/or safety functions may also be controlled based on detecting if the user is paying attention to the device.

SUMMARY

Determining whether a user is paying attention to a device may be used to enable or support biometric security (e.g., facial recognition) enabled features on the device. For example, a device can determine whether the user is paying attention to a device before authenticating the user or enabling access to particular data (e.g., passwords, personal data) or particular systems (e.g., payment systems) to prevent unintentional access. Attention may be determined by capturing an infrared illuminated image of the user of the device with the user's face in the captured image. Facial features of the user's face may be encoded to generate feature vectors in a feature space where the feature vectors define the user's facial features in the feature space. A set of classifiers may then be used on the feature vectors to determine if the user is paying attention to the device or not. Determining attention may include using one or more of the classifiers to determine if the feature vectors for the captured image correlate to feature vectors that are known (e.g., have been trained) for the user paying attention to the device.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

Figure 1:
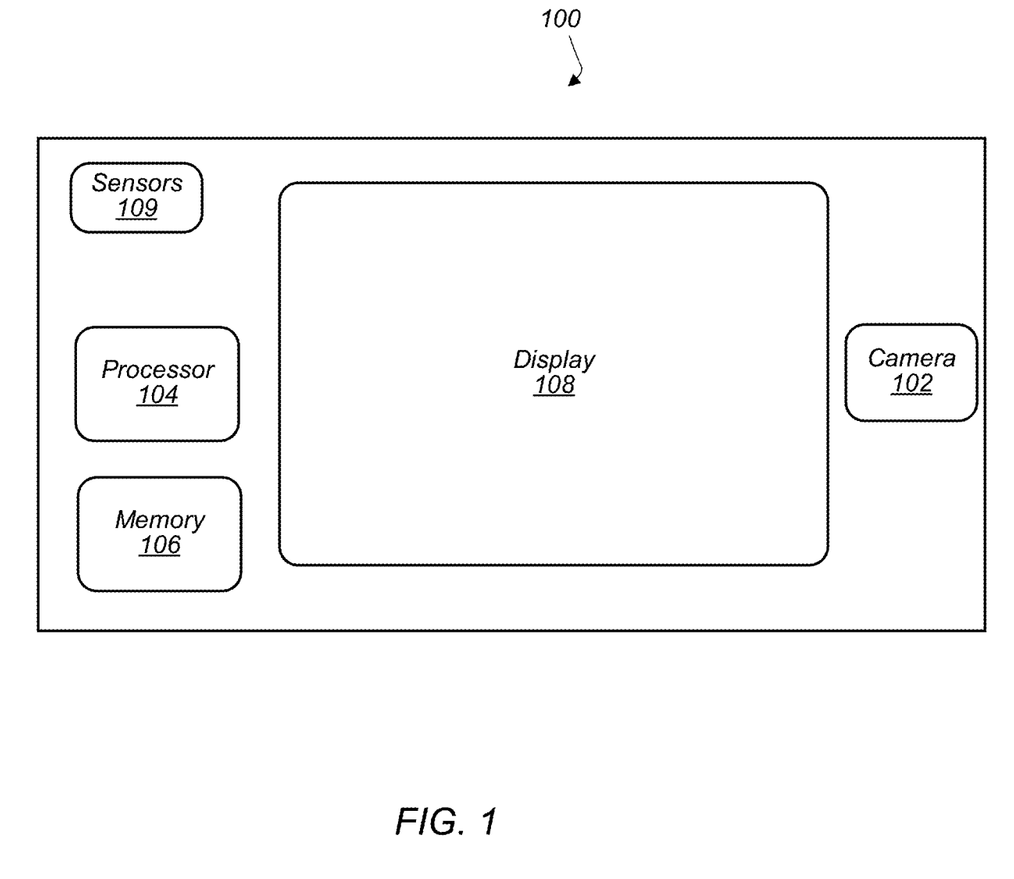
FIG. 1 depicts a representation of an embodiment of a device including a camera.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
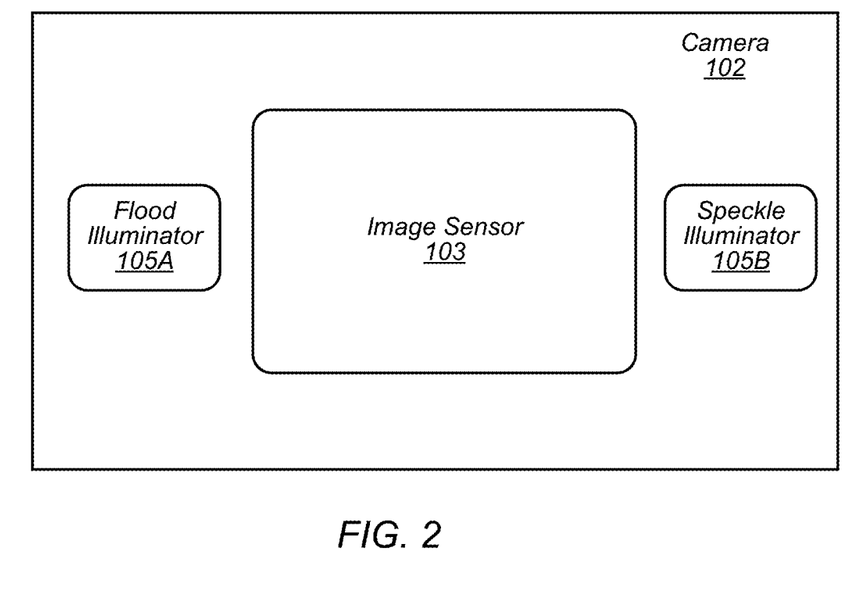
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator) and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor used to capture infrared images used for face detection and/or depth detection. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light. For depth detection or generating a depth map image, illuminator 105B may provide IR illumination with a speckle pattern. The speckle pattern may be a pattern of light spots (e.g., a pattern of dots) with a known, and controllable, configuration and pattern projected onto a subject. Illuminator 105B may include a VCSEL array configured to form the speckle pattern or a light source and patterned transparency configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
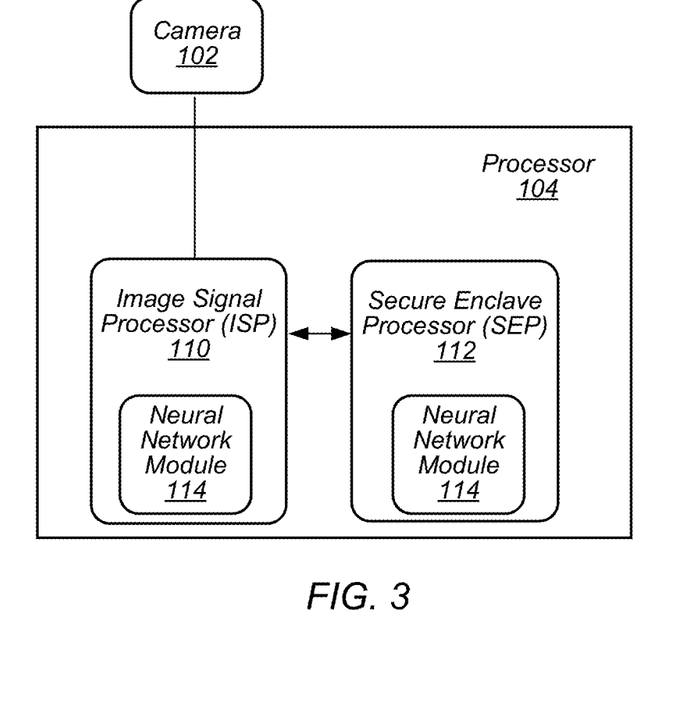
FIG. 3 depicts a representation of an embodiment of a processor on a device.

Images captured by camera 102 may be processed by processor 104. FIG. 3 depicts a representation of an embodiment of processor 104 on device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture and store images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature data from the images) from the enrollment process are stored in a template in device 100. The template may be stored, for example, in a template space in memory 106 of device 100. In some embodiments, the template space may be updated by the addition and/or subtraction of images from the template. A template update process may be performed by processor 104 to add and/or subtract template images from the template space. For example, the template space may be updated with additional images to adapt to changes in the authorized user's appearance and/or changes in hardware performance over time. Images may be subtracted from the template space to compensate for the addition of images when the template space for storing template images is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR and depth map images independently of each other before a final authentication decision is made for the user. For example, ISP 110 may process the images independently to determine characteristics of each image separately. SEP 112 may then compare the separate image characteristics with stored template images for each type of image to generate an authentication score (e.g., a matching score or other ranking of matching between the user in the captured image and in the stored template images) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored template images to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

In certain embodiments, processor 104 uses images from camera 102 to assess (e.g., determine) if a user is paying attention to device 100 or intentionally looking at device 100. For example, processor 104 may assess if the user is paying attention to display 108 and/or camera 102. As used herein, paying attention to device 100 may include the user intentionally looking at device 100 defined by, for example, the user looking (e.g., intentionally looking) into camera 102 and/or the user looking (e.g., intentionally looking) in a direction defined relative to camera 102. The direction defined relative to the camera may include, but not be limited to, looking slightly below camera (e.g., the user is looking and/or interacting with display 108). In some embodiments, paying attention to device 100 includes looking at other inputs and/or outputs on device 100 defined relative to camera 102 such as, but not limited to, headphones, microphones, volume buttons, and power ports.

Figure 4:
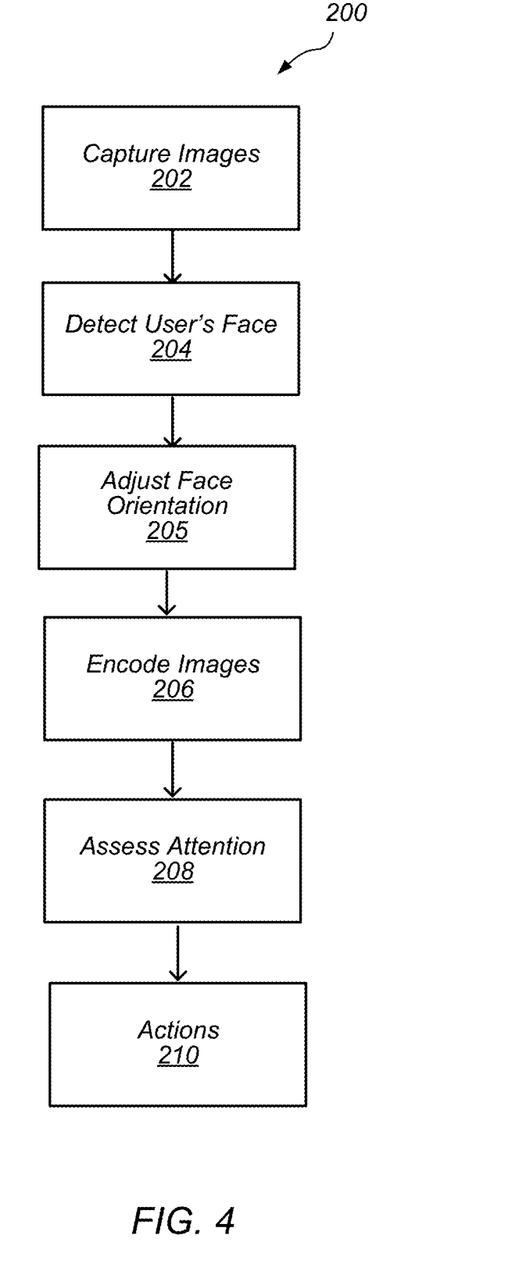
FIG. 4 depicts a flowchart of an embodiment of an attention detection process.

FIG. 4 depicts a flowchart of an embodiment of an attention detection process. Process 200 may include capturing images in 202. In certain embodiments, an image is captured using camera 102. The image captured may include a flood IR image and/or depth map image of the user. In certain embodiments, process 200 includes capturing and assessing flood images of the user. In 204, the user's face is detected in the image. If no face is detected in the image, then the image is not further processed. In certain embodiments, detecting the user's face in 204 includes providing a location of a bounding box around the user's face in the image. Additional outputs of the face detection may include, but not be limited to, pose of the user's face (e.g., pitch, yaw, and/or roll of the face in the image), distance between the face and device 100, and device orientation (e.g., in portrait mode, landscape right mode, or landscape left mode along with offset for head roll). Detection of the user's face in 204, along with output of the additional information, may be provided using ISP 110.

In certain embodiments, device orientation is determined using the orientation of the user's face in the image. Orientation of the user's face may be determined by ISP 110 during detection of the user's face. In some embodiments, device orientation is determined using an accelerometer or other orientation sensitive sensor on device 100. For example, the accelerometer may be used to determine if device 100 is in portrait mode, landscape right mode (e.g., device 100 is in landscape mode and the camera 102 is on the user's right side), or landscape left mode (e.g., device 100 is in landscape mode and the camera 102 is on the user's left side). In some embodiments, other inputs may be used to determine device orientation. For example, a coupling between device 100 and another device (e.g., a detachable keyboard) may be used to determine that device is oriented in a certain manner (e.g., the device is in landscape mode left because a keyboard is attached to a specific connector).

After the face is detected in 204, orientation of the face in the image may be, if needed, adjusted in 205 (e.g., rotated). In certain embodiments, encoding of feature vectors in 206 and/or attention determination in 208, described below, are processed with the user's face oriented in a specific orientation (e.g., portrait mode). Adjustment of the orientation of the user's face in 205 may, thus, be used to place the user's face in the proper orientation (e.g., portrait mode). In 205, the image may be rotated an amount determined from the device orientation determined in 204.

If the user's face is detected in the image, facial features of the user's face in the image may be encoded in 206 to define the user's facial features as feature vectors in a feature space. Encoding of the user's face in the image may be performed using processor 104. Thus, the output of 206 provides feature vectors representing the user's facial features in the feature space. The feature space may be an N-dimensional feature space.

Facial features of the user that may be encoded as feature vectors include, but are not limited to, the position of the face in the image, the position of the eyes in the image (including position of eyes relative to outline of face), position of the pupils in the image, head pose, position of device relative to the face, position of the camera relative to the eyes, opening angle of the eyes (e.g., ratio of eye width versus eyelid distance), reflection parameters, and/or active sensor parameters. Reflection parameters may include presence, intensity, and/or position of reflections on surfaces in the images including reflections in eyes of the user in the images. Reflections may result from, for example, the device screen backlight (e.g., backlight of display 108). Active sensor parameters may include presence, intensity, and/or position of active sensor lighting (e.g., light from active sensors such as the active IR sensor or active RGB sensor) in the eyes of the user. Using combinations of these different facial features to define feature vectors in the feature space may provide a feature space that considers the user's entire face along with distinctive features of the user's entire face.

In certain embodiments, in 208, the feature space (defined in 206) is assessed to determine if the user is paying attention to device 100. Assessing the feature space in 208 may include using one or more algorithms to determine if the user is paying attention to device 100. In certain embodiments, one or more classifiers (e.g., classification algorithms) are used to assess the feature space to determine if the user is paying attention to device 100. The classifiers may determine if the feature vectors found in the feature space correlate to known feature vectors for the user paying attention to device 100 and/or correlate to known feature vectors for the user not paying attention to the device. More particularly, in embodiments in which machine learning circuitry is implemented in the processor 104, the machine learning circuitry may encode the feature vectors and also provide output indicating whether or not the user appears to be paying attention to the device.

There are numerous different classifiers (e.g., on the order of 10s or 100s) that can be programmed into device 100 (e.g., instructions programmed into the device). Each of the different classifiers may be programmed into device 100 as different classifiers may provide advantages for determining attention for different areas (types) of feature vectors in the feature space. Examples of different classifiers that may be used include, but are not limited to, linear, piecewise linear, nonlinear classifiers, support vector machines, and neural network classifiers. Using each and every classifier programmed into device 100 to determine attention may, however, reduce the accuracy in determining attention and/or consume large amounts of power due to the number of calculations required. Reducing the number of classifiers needed to be used to determine attention for a specific use case may reduce power requirements and/or increase accuracy of the attention determination.

Figure 5:
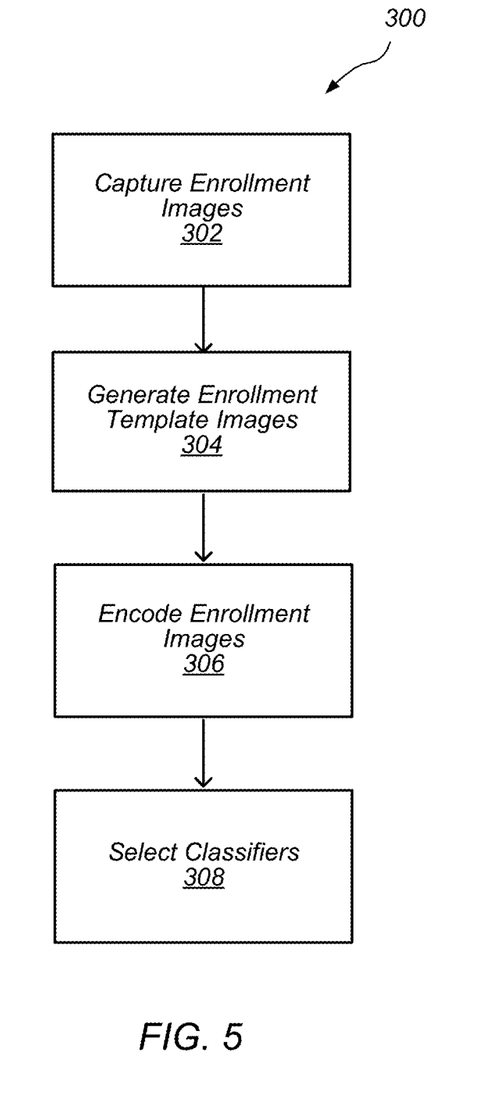
FIG. 5 depicts a flowchart of an embodiment of a process for selecting classifiers for attention determination based on the user of the device.

Only a selected number and/or type of classifiers may be used in 208 to determine if the user is paying attention to device 100. In certain embodiments, the selected number and/or type of classifiers used in 208 are based on the user of device 100. FIG. 5 depicts a flowchart of an embodiment of process 300 for selecting classifiers for attention determination based on the user of device 100. In certain embodiments, classifiers are selected in process 300 for a user enrolled with device 100 (e.g., a primary user or owner of the device that has gone through an enrollment protocol with the device).

In 302, reference images (e.g., enrollment images) may be captured in device 100. For example, camera 102 may capture reference images during the enrollment protocol with device 100. Reference images may include, but not be limited to, images of the user captured during the enrollment protocol that include the face of the user during selected motions performed by the user (e.g., different variations in poses with user looking at camera, different expressions by the user while looking at the camera, and/or different eye or eyelid expressions while looking at the camera). In 304, template images for enrollment may be generated by device 100 (e.g., generated by processor 104). Template images for enrollment may be, for example, template images used for facial recognition of the user in the reference images (e.g., the user enrolled by device 100). In 306, the template images are encoded. The template images may be encoded to define the user's facial features in the reference images as feature vectors (e.g., reference or enrollment feature vectors) in the feature space. In some embodiments, the referenced user's template images include only images with the user in the reference images paying attention to device 100. In such embodiments, feature vectors for the template images may be used as known feature vectors for attention determination (e.g., in step 208 in process 200).

In 308, classifiers may be selected for the user in the reference images based on the reference feature vectors in the feature space. Selecting the classifiers may include, for example, applying one or more metrics to the reference images to select one or more classifiers best suited for determining attention of the user in the reference images (e.g., select the classifiers that are accurate or most likely to be accurate for determining attention of the user in the reference images). Examples of suitable metrics for selecting classifiers include, but are not limited to, false rejection rate, false acceptance rate, precision, recall, accuracy, balanced error rate, and equal error rate. These metrics may be applied to reference feature vectors from the reference images to rank and select the classifiers for the user in the reference images. In some embodiments, attention rate during capture of the reference images is used to determine a classifier parameter such as a threshold for attention/non-attention. After the classifiers for the user in the reference images are selected in 308, the selected classifiers may be used to determine attention for the user in 208 of process 200, shown in FIG. 4.

In certain embodiments, selecting the classifiers in 308, shown in FIG. 5, includes determining which classifiers and/or how many classifiers are needed to accurately determine attention for the user in the reference images. Because different users have different facial features, the reference feature vectors may occupy certain spaces (e.g., areas) within the feature space as defined by the encoded features of the user's face. Thus, different users may have reference feature vectors that occupy different areas within the feature space and different classifiers may be used for the different users to best determine attention of the user.

In certain embodiments, selecting classifiers to be used for the user in the reference images includes a determination of the classifiers that more accurately (or best) operate in the areas occupied by the reference feature vectors for the user. Classifiers may be selected based on rankings of the classifiers for different areas (e.g., spaces) within the feature space. In certain embodiments, a machine learning process is used to rank classifiers for different areas within the feature space. Ranking the classifiers may include determining confidence levels for the classifiers in determining attention based on feature vectors in the feature space.

Figure 6:
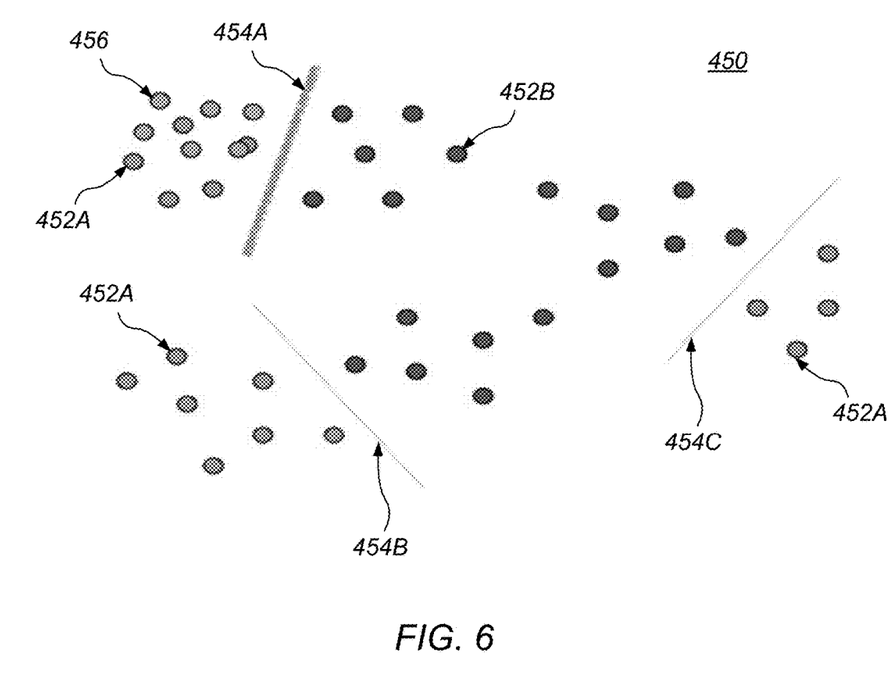
FIG. 6 depicts an example of classification of feature vectors in a feature space.

FIG. 6 depicts an example of classification of feature vectors in a feature space. Feature space 450 includes a plurality of feature vectors 452 including attention class feature vectors 452A (green circles) and non-attention class feature vectors 452B (red circles). Feature vectors 452 may be obtained, for example, using training images as described below for the embodiment of process 400 described in FIG. 8. As shown in FIG. 6, three linear classifiers 454A, 454B, 454C may be used to separate (e.g., partition) attention class feature vectors 452A from non-attention class feature vectors 452B. Feature vectors 456 (gray circles) may be feature vectors obtained from reference images of the user (e.g., feature vectors 456 are the reference feature vectors for the user). As shown in FIG. 6, linear classifier 454A provides more accurate classification of feature vectors 456 than the other classifiers in the area occupied by feature vectors 456 (e.g., the reference feature vectors for the user). Thus, linear classifier 454A may provide the best classification (e.g., be the most suitable classifier) for the user.

Figure 7:
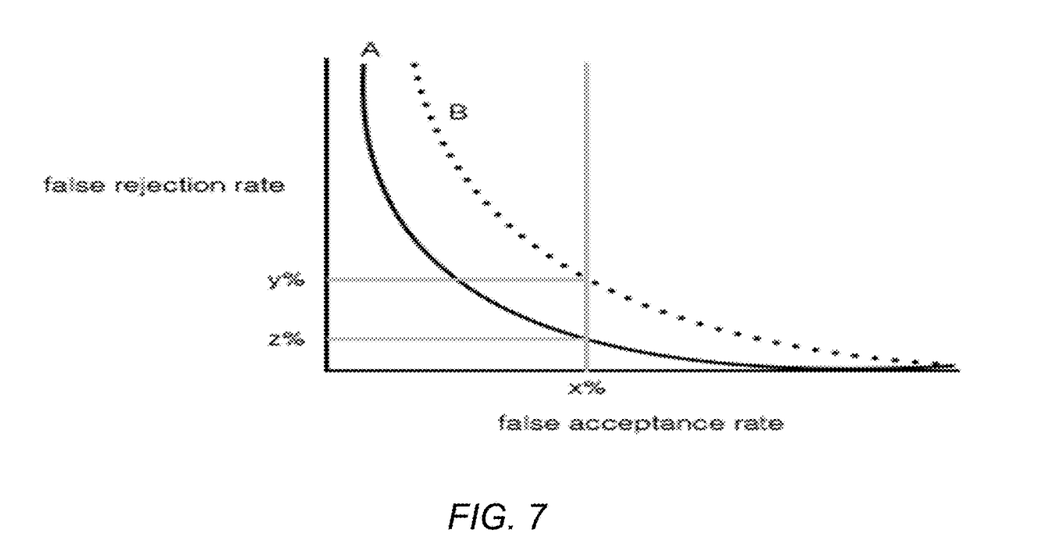
FIG. 7 depicts an example of a plot of false rejection rate versus false acceptance rate for two classifiers.

As another example, false rejection rates at a fixed false acceptance rate may be used to rank classifiers or determine a classifier more suitable for a set of feature vector data. FIG. 7 depicts an example of a plot of false rejection rate versus false acceptance rate for two classifiers. The false rejection rate and false acceptance rate for the classifiers may be calculated, for example, reference features vectors from reference images of the user. Classifier A (solid curve) has a false rejection rate of z % at the false acceptance rate of x %. Classifier B (dotted curve) has a false rejection rate of y % at the false acceptance rate of x %. Based on the plots in FIG. 7, classifier A would be used over classifier B as classifier A has the lower false rejection rate at the fixed false acceptance rate.

Figure 8:
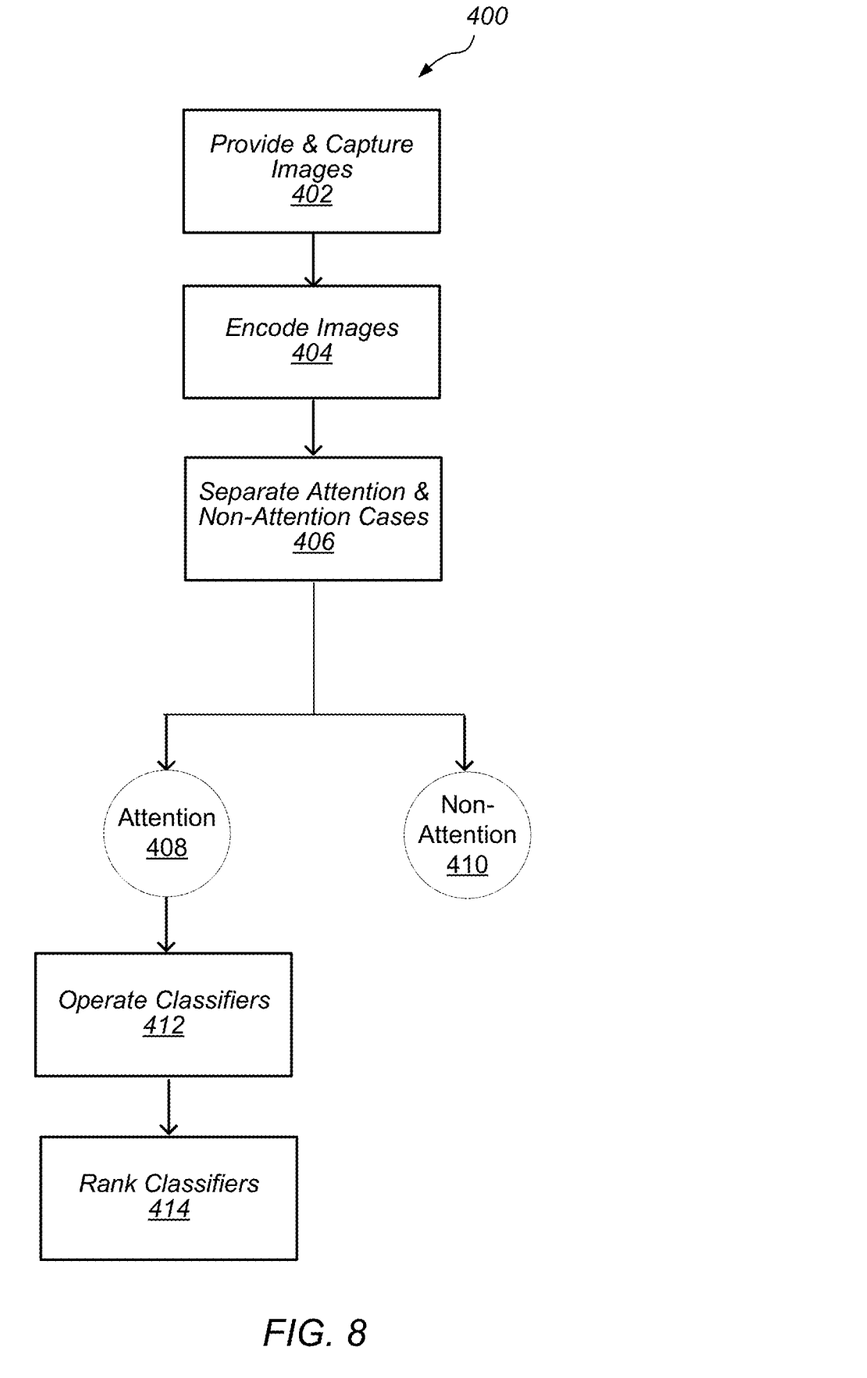
FIG. 8 depicts a flowchart of an embodiment of a process for ranking classifiers for different areas within the feature space.

FIG. 8 depicts a flowchart of an embodiment of process 400 for ranking classifiers for different areas within the feature space. Process 400 may be a machine learning process. Examples of machine learning processes include, but are not limited to, neural network processes and deep learning processes. In certain embodiments, process 400 is implemented using machine learning circuitry implemented in processor 104 of device 100. Training and designing of the machine learning circuitry may occur prior to manufacture of device 100 with the subsequently trained machine learning circuitry then being installed in the device. In some embodiments, process 400 is implemented using a computer system separate from device 100. For example, process 400 may be implemented on a server-based computer system or a personal computer system. The computer system used for process 400 (e.g., the "machine learning computer system") may include, or be coupled to, a camera that captures images in a substantially similar manner to camera 102 on device 100 and/or captures images with substantially similar properties to images captured by camera 102. Thus, the machine learning computer system may be able to process images in a substantially similar manner to device 100.

In 402, training images are provided to the machine learning computer system and the images are captured by the machine learning computer system. The training images may include images of the entire faces of different people either paying attention or not paying attention (non-attention) to the camera as the images are displayed to the camera used by the machine learning computer system. In certain embodiments, the training include different groups of people having the same attention to the camera (e.g., either attention or non-attention). Using such training images may allow the machine learning computer system to determine attention based on more subject-independent features.

Different groups of people may include people with many different features. People may have different features based on differences in, for example, gender and/or age. Feature differences, however, may not only be defined by differences in gender and/or age. Features may also be differentiated based on eye shape, pupil size, pupil color, opening angle of the eyes (e.g., ratio of eye width versus eyelid distance), position of the camera relative to the eyes (which may be based on device orientation), pose, glasses reflections, contact lens differentiations (e.g., different contact lenses may have different reflectivities or different colors), and/or different illumination conditions (e.g., different lighting situations such as indoor versus outdoor or different types of indoor light, different direction of light, types of reflection, etc.). The training images used with the machine learning computer system may use a plurality of different combinations of features describing entire faces of people to define as many different features as possible for both attention and non-attention cases within the feature space after encoding of the training images.

In some embodiments, training images used for training attention determination may include additional information associated with device orientation and/or device type. For example, different devices may have different sizes, shapes, and/or form factors as well as different camera locations. Thus, training images used to train attention determination may include training images specific to a particular type of device (e.g., a particular smartphone or tablet) in association with different orientations of the device. In such embodiments, a machine learning computer system trained for attention determination in association with the particular type of device may generate operating parameters that are subsequently included or configured in manufactured devices of the particular device type.

In some embodiments, as described above, different device types may have different camera placements on the devices. Thus, attention determination may be trained for the different camera placements on the different device types. Additionally, cameras on different device types may have different positions relative to the user depending on the device orientation, which may affect the direction and/or angle to look for attention. The direction and/or angle to look for attention may be particularly affected by the device orientation of larger devices (e.g., tablets). For example, with larger devices such as tablets, the camera may have large variations in position relative to the user depending on the device orientation. Thus, in some embodiments, the training images used to train attention determination may train the machine learning computer system (e.g., attention determination may be trained) to adjust where to look (e.g., where to look for the eyes) for attention based on device type and/or device orientation.

In some embodiments, attention determination may be trained to adjust detecting attention based on distance from the camera (e.g., distance between the eyes and the camera) and/or different types of cameras associated with different types of devices. Attention determination may be trained for different types of cameras as different cameras may have different intrinsic parameters that affect other measurements (e.g. distance). In some embodiments, the training images used to train attention determination may include images of users looking at different areas of the device and the machine learning computer system may be trained to look for attention with users looking at the different areas on and/or around the device. For example, some users can be looking at the portions of the device further away from the camera.

After the training images are provided to and captured by the machine learning computer system in 402, the training images may be encoded in 404 (e.g., using processor 104 as described above) to define the facial features in the training images as feature vectors (e.g., training image feature vectors) in the feature space. After encoding in 404, the feature space is filled with a plurality of feature vectors defined by the variety of different features described above with people in the images either in an attention or a non-attention state. In 406, the feature space may be separated (e.g., partitioned) into attention cases 408 and non-attention cases 410. Attention cases 408 and non-attention cases 410 may be output from the machine learning computer system. Thus, the machine learning computer system outputs a partitioned feature space with separated known feature vectors for attention cases 408 and known feature vectors for non-attention cases 410. In some embodiments, these known feature vectors are used to assess if a user is paying attention to device 100 (e.g., in step 208 in process 200).

The output from the machine learning computer system may be provided to a computer processor. The computer processor may be on the same computer system as the machine learning computer system or on a different computer system (e.g., a computer system similar to the computer system located in device 100). In certain embodiments, in 412, the computer processor operates a plurality of classifiers on the feature vectors for attention cases 408 in the feature space. The plurality of classifiers may include different classifiers with different classification algorithms. The number or type of classifiers may be selected as desired or needed to provide accurate classification of the feature vectors for attention cases 408 in the feature space.

In certain embodiments, the feature vectors for attention cases 408 are clustered or distributed in patterns in different areas within the feature space. The classifiers may be used to define clusters and/or patterns of feature vectors within the feature space. As different classifiers utilize different classification algorithms for the feature space, certain classifiers may more accurately define different clusters in different areas within the feature space. In 414, the classifiers may be ranked for different areas within the feature space. Ranking the classifiers may include determining confidence levels for the classifiers in defining clusters or patterns for different areas within the feature space. For example, the higher the confidence level for a classifier in defining a cluster for a certain area within the feature space, the higher the ranking for the classifier.

The classifier rankings determined in 414 may be provided to step 308 in process 300, shown in FIG. 5, to be used in selecting classifiers that more accurately operate in areas occupied by and/or near the reference feature vectors (e.g., areas associated with the reference feature vectors) for the user in the reference images. Selecting classifiers that accurately operate in areas occupied by and/or near the reference feature vectors for the user in the reference images may reduce the number of classifiers used to determine attention of the user. It is to be understood that the classifier operations and rankings in 412 and 414, respectively, and shown in FIG. 8, may also be performed on the feature vectors for non-attention cases 410. As such, rankings useable for selecting classifiers for non-attention determinations may be provided to process 300, shown in FIG. 5, or another classifier selection process.

Using the classifier rankings determined by process 400, shown in FIG. 8, in support of the selection of classifiers determined by process 300, shown in FIG. 5, may improve the accuracy of attention determination (in step 208 of process 200, shown in FIG. 4). The accuracy of the attention determination in 208 may be improved by using a reduce number of classifiers that are better suited (e.g., higher ranked) to areas of the feature space occupied by the reference feature vectors. Additionally, using a reduced number of classifiers may improve the accuracy for attention determination in cases that are typically more difficult. Cases that are typically more difficult include, but are not limited to, cases with reflections in glasses, cases with users that do not fit into typical training images used, and/or cases with images taken during difficult situations (e.g., persons with glasses outside or other abnormal illumination situations). The features that make these cases difficult may be detected (e.g., detect a user with glasses) and a reduced number of classifiers may be dedicated to the cases based on the detected features based on the dedicated classifiers being most suitable for use with the detected features.

In some embodiments, the image captured in 202, shown in FIG. 4, may include two or more faces in the image (e.g., two or more user's faces in the image). In such embodiments, face detection (in 204) and image encoding (206) may occur for each of the faces in the image. Attention determination (in 208) may also be made for each of the faces in the image. Determination of attention for multiple faces in the image may support certain interactions with device 100 in addition to interactions supported by attention determination for a single user's face in the image.

After the determination of attention by the user (or users) in 208, one or more actions based on the attention determination may be made in 210. For example, certain actions for device 100 may only be allowed if the user is paying attention to the device or certain actions may be inhibited if the user is not paying attention to the device and/or more than one user is paying attention to the device. In some embodiments, device 100 is only unlocked if the user is determined to be paying attention to the device. Unlocking device 100 may occur through an unlocking mechanism (e.g., a passcode, biometric interaction, or other interaction). Only allowing device 100 to be unlocked if the user is paying attention to the device may inhibit accidental or malicious unlocking of the device without the user's explicit intent. In some embodiments, device 100 may allow financial transactions to occur only if the user is determined to be paying attention to the device. Financial transactions may include, but not be limited to, mobile payment services, digital wallet services, and in-app purchases.

In some embodiments, if more than one user (person) is determined to be paying attention to device 100, selected privacy features may be applied to the device. The selected privacy features may prevent an additional user from accessing or viewing sensitive information that the primary user of device 100 does not intend for other users. For example, sensitive information or content may be disabled if more than one user is determined to be paying attention to device 100. In some embodiments, a warning is displayed if more than one user is determined to be paying attention to device 100.

In some embodiments, attention determination is used to control audio, haptic, visual or other user interface notifications from device 100. For example, only a visual notification may be provided to the user if the user is determined to already be paying attention to device 100. Similarly, only an audio or haptic notification may be provided to the user when the user is determined to not be paying attention to device 100.

In some embodiments, attention determination is used to control energy saving features for device 100. Energy saving features may include, but not be limited to, turning off or dimming the screen when the user, or users, is detected as not paying attention to device 100.

In some embodiments, capturing images using camera 102 (or another camera) may be controlled using attention determination. For example, an image may only be captured using camera 102 when each user in the frame of the image is detected as paying attention to the camera.

In some embodiments, safety features associated with device 100 may be controlled using attention determination. For example, parts of the user interface of device 100 may be disabled if paying attention to the device can be dangerous or distraction such as when the device is in car mode. In some embodiments, safety features are activated while the user is paying attention to device 100 and performing other activities. For example, if the user is paying attention to device 100 while walking, video from a back-facing camera showing where the user is going may be played on display 108 of the device.

In some embodiments, device 100 may only react to voice commands if the user is determined to be paying attention to the device. In some embodiments, device 100 may only allow typing or user input on display 108 (or another input component) if the user is paying attention to the device to inhibit accidental input to the device.

In certain embodiments, attention determination is used to detect distress or nervousness of the user. Distress or nervousness may be detected by assessing (e.g., analyzing) the frequency of attention/non-attention changes. If distress or nervousness is detected, device 100 may adapt or simplify the user interface and/or offer help to the user.

In some embodiments, attention determination may be useful in assessing eye-based disabilities. An indication of eye-based disability may be when the user interacts with device 100 but typically does not look into the direction of the device (e.g., does not pay attention to the device).

In certain embodiments, attention determination is used to interpret usage context. Usage context may be used to adapt features of device 100 and/or the interface of the device accordingly. For example, headphones may be disabled and loudspeakers enabled when a video is playing on device 100 and more than one user is detected to be paying attention to the device. Another example is that ringtone intensity may be reduced when several users are detected to be paying attention to the device, which may be an indicator of an inappropriate situation for a loud ringtone.

In certain embodiments, as shown in FIG. 1, device 100 includes one or more sensors 109. Sensors 109 may include, for example, accelerometer, orientation, and/or motion sensors. In one embodiment, sensors 109 are used to determine a position of device 100 relative to the user's head. Data from sensors 109 may be provided to processor 104 and, in some embodiments, the data may be used to supplement image data in determining attention of the user. In some embodiments, sensor data may be used to override attention determination. For example, if device 100 is detected as moving quickly and/or erratically, such movement may be an indication that the device should not be unlocked.

In some embodiments, sensor data may be implemented into the training or learning process for attention determination. For example, sensor data may be provided as input into the machine learning computer system used in process 400 and encoded as feature vectors in the feature space. Encoding the sensor data as feature vectors in the machine learning process may allow data input from sensors 109 to be used as feature vectors in the attention determination of process 200.

In some embodiments, user data may be implemented into the machine learning computer system used in process 400. User data may include, for example, age of the user, the user has glasses or contact lenses, and/or disabilities of user. Additionally, user data for the user in the reference images (e.g., the enrolled user) may be provided to processor 104 and used in combination with the user data used in process 400 to enhance accuracy in the attention determination of process 200.

In certain embodiments, one or more process steps described herein may be performed by one or more processors (e.g., a computer processor) executing instructions stored on a non-transitory computer-readable medium. For example, process 200, shown in FIG. 4, may have one or more steps performed by one or more processors executing instructions stored as program instructions in a computer readable storage medium (e.g., a non-transitory computer readable storage medium).

Figure 9:
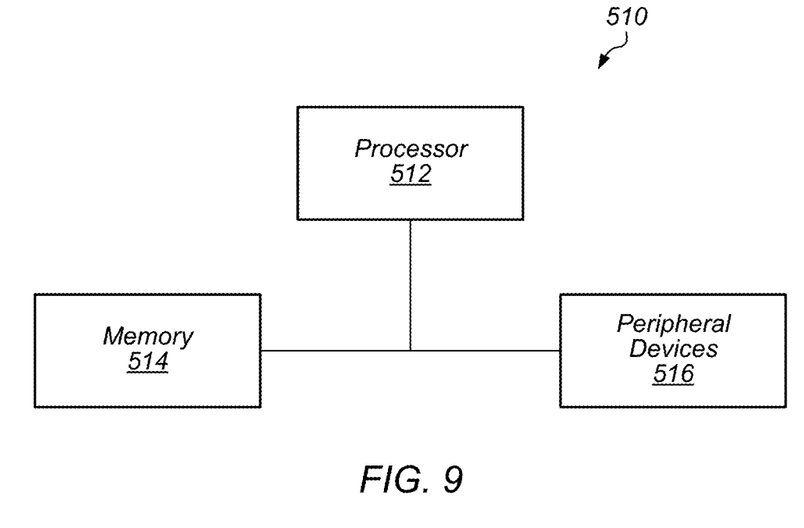
FIG. 9 depicts a block diagram of one embodiment of an exemplary computer system.

FIG. 9 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, shown in FIG. 4. In the embodiment of FIG. 9, computer system 510 includes processor 512, memory 514, and various peripheral devices 516. Processor 512 is coupled to memory 514 and peripheral devices 516. Processor 512 is configured to execute instructions, including the instructions for process 200, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 10:
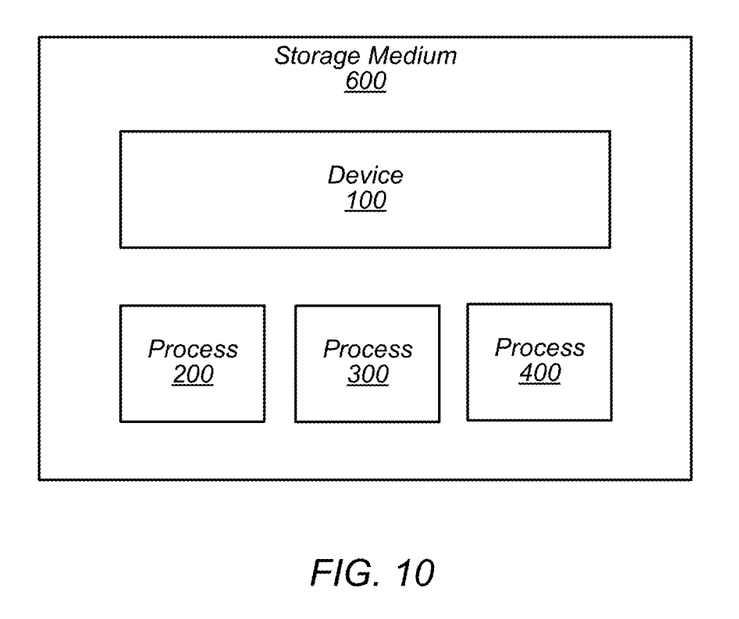
FIG. 10 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 10, other input/output (I/O) devices such as video hardware, audio hardware, user interface devices, networking hardware, etc.).

Turning now to FIG. 10, a block diagram of one embodiment of computer accessible storage medium 600 including one or more data structures representative of device 100

(depicted in FIG. 1) included in an integrated circuit design and one or more code sequences representative of process 200, 300, and/or 400 (shown in FIGS. 2, 3, and 6). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 500 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
    capturing a plurality of reference images of a user using a camera located on a device, the device comprising a computer processor and a memory, wherein the captured reference images include the face of the user, the user being an authorized user of the device;
    generating a plurality of reference template images from the captured reference images;
    encoding a plurality of facial features of the user from the reference template images to generate reference feature vectors defining the facial features in a feature space, wherein at least one reference feature vector defines the user paying attention to the device, and wherein paying attention to the device includes the user looking at the device in a direction defined relative to the camera in the reference template images;
    selecting one or more classifiers based on the at least one reference feature vector that defines the user paying attention to the device, wherein the one or more classifiers are selected from a plurality of classifiers stored in the memory by:
        determining an area of the feature space associated with the at least one reference feature vector that defines the user paying attention to the device; and
        selecting the one or more classifiers by selecting classifiers with higher rankings in a ranking of the classifiers for the determined area of the feature space, wherein the ranking of the classifiers is based on confidence levels of the classifiers classifying the at least one reference feature vector that defines the user paying attention to the device in the determined area of the feature space, and wherein the ranking of the classifiers for different areas in the feature space has been determined by operating the plurality of classifiers of feature vectors generated from a plurality of training images that include users' faces paying attention to the device;
    capturing, using the camera, at least one additional image of the user, the additional captured image including the face of the user;
    encoding a plurality of facial features of the user from the additional captured image to generate feature vectors defining the facial features of the user from the additional captured image in the feature space; and
    determining whether the user in the additional captured image is paying attention to the device assessing the feature vectors for the additional captured image using the selected classifiers to correlate the feature vectors for the additional captured image to the at least one reference feature vector that defines the user paying attention to the device.

2. The method of claim 1, wherein the reference images of the user using the camera located on the device are captured during an enrollment protocol.

3. The method of claim 1, wherein selecting at least one classifier includes selecting a classifier with a highest ranking in the ranking of the classifiers for the determined area of the feature space.

4. The method of claim 1, wherein the classifier rankings are based on confidence levels of the classifiers in defining clusters of feature vectors in the different areas of the feature space associated with the feature vectors generated from the plurality of training images that include the users' faces paying attention to the device.

5. The method of claim 1, further comprising assessing an orientation of the device when the at least one additional image is captured, and rotating the at least one additional image to place a face of the user in the image in a selected orientation in response to the face of the user not being in the selected orientation.

6. The method of claim 1, further comprising controlling one or more actions of the device based on the determination whether the user is paying attention to the device.

7. The method of claim 1, wherein the reference template images are configured to be used to authenticate the user as the authorized user of the device.

8. A device, comprising:
    a computer processor;
    a memory;
    a camera;
    at least one illuminator providing infrared illumination;
    circuitry coupled to the camera and the illuminator, wherein the circuitry is configured to:
        capture a plurality of reference images of a user using the camera, wherein the captured reference images include the face of the user, the user being an authorized user of the device;
generate a plurality of reference template images from the captured reference images;
encode a plurality of facial features of the user from the reference template images to generate reference feature vectors defining the facial features in a feature space, wherein at least one reference feature vector defines the user paying attention to the device, and wherein paying attention to the device includes the user looking at the device in a direction defined relative to the camera in the reference template images;
select one or more classifiers based on the at least one reference feature vector that defines the user paying attention to the device, wherein the one or more classifiers are selected from a plurality of classifiers stored in the memory by:
determining an area of the feature space associated with the at least one reference feature vector that defines the user paying attention to the device; and
selecting the one or more classifiers by selecting classifiers with higher rankings in a ranking of the classifiers for the determined area of the feature space, wherein the ranking of the classifiers is based on confidence levels of the classifiers classifying the at least one reference feature vector that defines the user paying attention to the device in the determined area of the feature space, and wherein the ranking of the classifiers for different areas in the feature space has been determined by operating the plurality of classifiers on feature vectors generated from a plurality of training images that include users' faces paying attention to the device;
capture, using the camera, at least one additional image of the user, the additional captured image including the face of the user;
encode a plurality of facial features of the user from the additional captured image to generate feature vectors defining the facial features of the user from the additional captured image in the feature space; and
determine whether the user in the additional captured image is paying attention to the device by assessing the feature vectors for the additional captured image using the selected classifiers to correlate the feature vectors for the additional captured image to the at least one reference feature vector that defines the user paying attention to the device.

9. The device of claim 8, wherein the camera comprises an infrared sensor.

10. The device of claim 8, wherein the at least one illuminator comprises a flood infrared illuminator.

11. The device of claim 8, wherein the at least one illuminator comprises a speckle pattern illuminator, and wherein the circuitry is configured to:

capture an image of the user while the user is being illuminated with speckle pattern illumination; and
generate a depth image of the user from the captured image.

12. The device of claim 8, further comprising at least one sensor configured to assess an orientation of the device when the at least one additional image is captured.

13. The device of claim 8, wherein the circuitry is configured to rotate the at least one additional image to place a face of the user in the image in a selected orientation.

14. The device of claim 8, wherein the circuitry is configured to control one or more operations of the device based on the determination whether the user is paying attention to the device.

15. A method, comprising:
providing a plurality of training images to a computer system, the computer system comprising a computer processor and a memory, wherein the provided training images include faces of reference users, and wherein the reference users' faces in the training images include a plurality of different facial features associated with a plurality of groups of people;
encoding facial features of the reference users' faces in the provided training images to generate feature vectors defining the facial features in a feature space;
separating the feature vectors in the feature space into a first set of feature vectors in the feature space and a second set of feature vectors in the feature space, the first set of feature vectors being feature vectors associated with the reference users' faces paying attention to the computer system and the second set of feature vectors being feature vectors associated with the reference users' faces not paying attention to the computer system;
operating a plurality of classifiers on the first set of feature vectors in the feature space;
ranking the classifiers in a plurality of areas in the feature space, wherein ranking a classifier in an area in the feature space comprises ranking the classifier based on a confidence level of the classifier in defining a grouping of feature vectors in the area of the feature space;
providing the ranking of the classifiers to a device having a camera;
selecting one or more classifiers for use in determining of attention to the device by a user of the device based on the ranking of the classifiers;
capturing, using the camera, at least one image of a user, the captured image including a face of the user;
generating one or more feature vectors from the captured image; and
determining whether the user in the captured image is paying attention to the device by using the selected classifiers to classify the one or more feature vectors from the captured image.

16. The method of claim 15, wherein the computer system comprises machine learning circuitry.

* * * * *